US007966179B2

(12) United States Patent
Oh et al.

(10) Patent No.: US 7,966,179 B2
(45) Date of Patent: Jun. 21, 2011

(54) METHOD AND APPARATUS FOR DETECTING VOICE REGION

(75) Inventors: Kwang-cheol Oh, Seongnam-si (KR); Ki-young Park, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 869 days.

(21) Appl. No.: 11/340,693

(22) Filed: Jan. 27, 2006

(65) Prior Publication Data

US 2006/0178881 A1 Aug. 10, 2006

(30) Foreign Application Priority Data

Feb. 4, 2005 (KR) ........................ 10-2005-0010598

(51) Int. Cl.
*G10L 15/20* (2006.01)

(52) U.S. Cl. ........ 704/233; 704/208; 704/248; 704/253; 704/E11.001; 704/E11.003

(58) Field of Classification Search .................. 704/208, 704/E11.003, E11.001, 253, 248, 233
See application file for complete search history.

(56) References Cited

U.S. PATENT DOCUMENTS 4,959,865 A * 9/1990 Stettiner et al. ............... 704/233
5,611,019 A * 3/1997 Nakatoh et al. ............... 704/233
6,023,671 A * 2/2000 Iijima et al. ................... 704/214
6,031,915 A * 2/2000 Okano et al. ..................... 381/56
6,411,925 B1 * 6/2002 Keiller .......................... 704/200
6,427,134 B1 * 7/2002 Garner et al. ................. 704/233
6,453,291 B1 * 9/2002 Ashley .......................... 704/233
6,574,592 B1 * 6/2003 Nankawa et al. ............. 704/206
6,658,380 B1 12/2003 Lockwood et al.
6,778,954 B1 8/2004 Kim et al.
6,782,363 B2 8/2004 Lee et al.
7,412,376 B2 * 8/2008 Florencio et al. ............. 704/206
7,440,892 B2 * 10/2008 Tamura ......................... 704/233
2002/0116189 A1 * 8/2002 Yeh et al. ...................... 704/248
2004/0030544 A1 * 2/2004 Ramabadran ................. 704/205
2005/0131689 A1 * 6/2005 Garner et al. ................. 704/240

FOREIGN PATENT DOCUMENTS

EP 0909442 B1 * 2/1997
KR 10-0450787 B1 9/2004

OTHER PUBLICATIONS

Kim, H.-I., and Park, S.-K.: 'Voice activity detection algorithm using radial basis function network', Electron. Lett., 2004, 40, pp. 1454-1455.*

J. Sohn and W. Sung, "A voice activity detector employing soft decision based noise spectrum adaptation," Proc. IEEE Int. Conf. Acoustics, Speech, Signal Processing, vol. 1, pp. 365-368, 1998.*

(Continued)

*Primary Examiner* — Richemond Dorvil
*Assistant Examiner* — Greg Borsetti
(74) *Attorney, Agent, or Firm* — Staas & Halsey LLP

(57) ABSTRACT

A method and apparatus for distinguishing a voice region from a non-voice region in an environment where various types of noise and voice are mixed together are provided. The method includes the steps of converting an input voice signal into a frequency domain signal by preprocessing the input voice signal, performing sigmoid compression on the converted signal, transforming a spectrum vector generated by the sigmoid compression into a voice detection parameter in scalar form, and detecting the voice region using the parameter.

17 Claims, 8 Drawing Sheets

OTHER PUBLICATIONS

J. Sohn, N.S Kim and W. Sung, A statistical model-based voice activity detector. IEEE Signal Process. Lett. 6 1 (Jan. 1999), pp. 1-3.*

Surendran, Arun C. ; Sukittanon, Somsak ; Platt, John: Logistic Discriminative Speech Detectors Using Posterior SNR. In: Proc. IEEE Int. Conf. on Acoustics, Speech, and Signal Processing (ICASSP) vol. V, 2004, pp. 625-628.*

B. Wu, K. Wang, L. Kuo, "A noise estimator with rapid adaptation in variable-level noisy environments", Proceeding ROCLING XVI, Taipei, Sep. 2004.*

Hollier, M. P., Hawksford, M. 0. and Guard, D. R. "Error activity and error cntropy as a measure of psychoacoustic significance in the perceptual domain". ZEE Proc. Vision, Image and Signal Processing, 141 (3), 203-208, 1994.*

Moxham, J.R.E. Jones, P.A. McDermott, H.J. Clark, G.M. "A new algorithm for voicing detection and voice pitch estimationbased on the neocognitron" Publication Date: Aug. 31-Sep. 2, 1992, p. 204-213, Helsingoer Denmark.*

Matsui, T. Soong, F.K. Biing-Hwang Juang "Classifier design for verification of multi-class recognition decision" Publication Date: 2002.*

P. Green J. P. Barker, M. Cooke, "Robust ASR based on clean speech models: An evaluation of missing data techniques for connected digit recognition in noise," in Proc. Eurospeech 2001, Aalborg, Denmark, Sep. 2001, pp. 213-216.*

J. Barker, L. Josifovski, M. Cooke, and P. Green, "Soft decisions in missing data techniques for robust automatic speech recognition," in Proc. ICSLP 2000, Beijing, China, Sep. 2000, pp. 373-376.*

Philippe Renevey and Andrzej Drygajlo. "Entropy Based Voice Activity Detection in Very Noisy Conditions" Eurospeech 2001.*

Jialin Shen, Jeihweih Hung, Linshan Lee, "Robust entropybased endpoint detection for speech recognition in noisy environments", International Conference on Spoken Language Processing, Sydney, 1998.*

Notice of Examination Report (NER) issued by the Korean Intellectual Property Office on Jul. 24, 2006, in priority Korean Patent Application No. 10-2005-0010598, and English translation thereof.

* cited by examiner

METHOD AND APPARATUS FOR DETECTING VOICE REGION

CROSS-REFERENCE TO RELATED APPLICATION

This application claims priority from Korean Patent Application No. 10-2005-0010598 filed on Feb. 4, 2005 in the Korean Intellectual Property Office, the disclosure of which is incorporated herein by reference in its entirety.

BACKGROUND OF THE DISCLOSURE

1. Field of the Disclosure

The present disclosure relates generally to voice recognition technology, and more particularly, to a method and apparatus for distinguishing a voice region from a non-voice region in an environment where various types of noise and a voice are mixed together.

2. Description of the Related Art

Recently, with the development of computers and the advancement of communication technology, various multimedia-related technologies have been developed, including technology for generating and editing various types of multimedia data, technology for recognizing video/voice among input multimedia data, and technology for compressing video/voice more efficiently. Of the technologies, the technology for detecting a voice region in a noisy environment is a basic technology essential to various fields such as the voice recognition field and the voice compression field. However, it is not easy to detect a voice region because the voices are mixed with various types of noise. Furthermore, there are various types of noise such as continuous noise and burst noise. Accordingly, in such an arbitrary environment, it is not easy to both detect a region in which voices exist and then to extract the voices.

As a result, the accurate detection of a voice region in a noisy environment plays an important role in improving voice recognition and the enhancement of convenience for a user. The technology for distinguishing a voice region from a non-voice region and detecting the voice region mainly includes a field using frame energy as in U.S. Pat. No. 6,658,380, a field using time-axis filtering as in U.S. Pat. No. 6,782,363 (hereinafter referred to as "patent '363"), a field using frequency filtering as in U.S. Pat. No. 6,574,592 (hereinafter referred to as "patent '592") and a field using the linear transformation of frequency information as in U.S. Pat. No. 6,778,954 (hereinafter referred to as "patent '954").

As patent '945, the present invention pertains to the field using the linear transformation of frequency information, but it is different in that it is not based on a probabilistic model but uses a rule-based approach, unlike patent '945.

Patent '363 calculates voice region detection parameters through feature parameter filtering in order to detect energy-based one-dimensional feature parameters, and has a filter for edge detection. Furthermore, patent '363 is configured to detect a voice region using a finite state machine. The technology disclosed in patent '363 is advantageous in that only a small amount of calculation is required and end points are detected regardless of noise level, but is problematic in that there is no solution for burst noise because energy-based one-dimensional feature parameters are used.

Furthermore, patent '592 discloses a technology for detecting voices using the energy of an output signal that has passed through a band pass filter that is adjusted to the voice frequency band. In this process, both length and size information are used. Patent '592 is advantageous in that a voice region can be detected using a relatively small amount of calculation, but is problematic in that it is impossible to detect a voice signal having low energy and the start portion of a consonant having low energy in the voice signal, and it is difficult to determine a threshold value, and variation in the threshold value affects the performance thereof.

Meanwhile, patent '954 discloses a technology for performing real-time modeling for noise and voices using a Gaussian distribution, updating models by estimating voices and noise even if voices and noise are mixed with each other, and removing noise based on a Signal-to-Noise Ratio (SNR) estimated through the modeling. However, patent '954 uses single noise source models so that there is a problem in that it is considerably affected by input energy.

The problems of the conventional technologies are summarized as follows. First, a parameter value varies depending on the amount of noise. Second, a threshold value must be varied according to the energy of a noise signal.

SUMMARY OF THE DISCLOSURE

Accordingly, the present invention has been made keeping in mind the above problems occurring in the prior art, and an object of the present invention is to provide a method and apparatus for efficiently distinguishing a voice region from a non-voice region in an environment where various types of noise and voices are mixed with each other.

In order to accomplish the above object, the present invention provides a method of detecting a voice region, including the steps of (a) converting an input voice signal into a frequency domain signal by preprocessing the input voice signal; (b) performing sigmoid compression on the converted signal; (c) transforming a spectrum vector generated by the sigmoid compression into a voice detection parameter in scalar form; and (d) detecting the voice region using the parameter.

BRIEF DESCRIPTION OF THE DRAWINGS

The above and other objects, features and advantages of the present invention will be more clearly understood from the following detailed exemplary description taken in conjunction with the accompanying drawings, in which.

DESCRIPTION OF THE PREFERRED EMBODIMENTS

Figure 1:
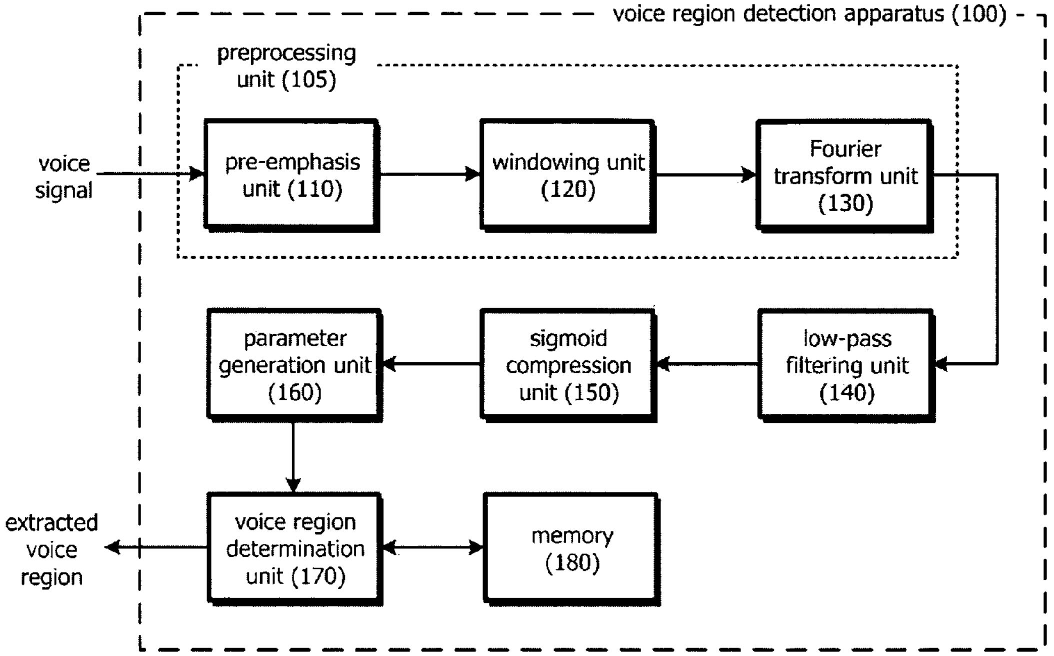
FIG. 1 is a diagram showing the construction of an apparatus for detecting a voice region in accordance with one embodiment of the present invention.

Reference should now be made to the drawings, in which the same reference numerals are used throughout the different drawings to designate the same or similar components.

The present invention is characterized by representing a signal with a vector that distinguishes the signal from noise through smoothing and sigmoid compression processes with respect to a power spectrum, converting the vector into a scalar value, and using the scalar value as a voice detection parameter.

FIG. 1 is a block diagram showing the construction of an apparatus 100 for detecting a voice region in accordance with one embodiment of the present invention.

First, a preprocessing unit 105 converts an input voice signal into a frequency domain signal by preprocessing the input voice signal. The preprocessing unit 105 may include a pre-emphasis unit 110, a windowing unit 120 and a Fourier transform unit 130.

The pre-emphasis unit 110 performs pre-emphasis on the input voice signal. Assuming that a voice signal is s(n) and an m-th frame signal is d(m,n) when the signal s(n) is divided into a plurality of frames, the signal d(m,n) and a signal d(m,D+1), which is pre-emphasized and overlaps the rear portion of a previous frame, are expressed by Equation (1):

$$d(m,n)=d(m-1,L+n)\ 0\leqq n\leqq D$$

$$d(m,D+n)=s(n)+\zeta\cdot s(n-1)\ 0\leqq n\leqq L \quad (1)$$

where D is the length by which the signal d(m,D+1) overlaps the previous frame, L is the frame length, and ζ is a constant used in the pre-emphasis process.

The windowing unit 120 applies a predetermined window (for example, a Hamming window) to the pre-emphasized signal. A signal y(n), to which the predetermined window is applied, has been discrete-Fourier transformed into a frequency domain signal using Equation (2):

$$Y_m(k)=\frac{2}{M}\sum_{n=0}^{M-1}y(n)e^{-j2\pi nk/M}\quad 0\leq k\leq M \quad (2)$$

where $Y_m(k)$ is divided into a real part and an imaginary part.

A low-pass filtering unit 140 low-pass-filters the transformed frequency domain signal. This low-pass filtering process removes relatively high frequency components. The reason for performing low-pass filtering is to prevent a spectrum from being affected by pitch harmonics as well as to acquire a smooth spectrum. In this case, the term "pitch" refers to the fundamental frequency of a voice signal and the term "harmonic" refers to a frequency that is an integer multiple of the fundamental frequency.

Furthermore, low-pass filtering helps consonants maintain parameter values similar to those of vowels. Vowels are mainly composed of low frequency components, so that the voice signals thereof are smooth, but relative to vowels, the consonants have many high frequency components, so that the voice signals thereof are not smooth. The present invention distinguishes voice from non-voice noise based on a single determination criterion (parameter) regardless of vowels and consonants, and thus, uses low-pass filtering.

Figure 2:
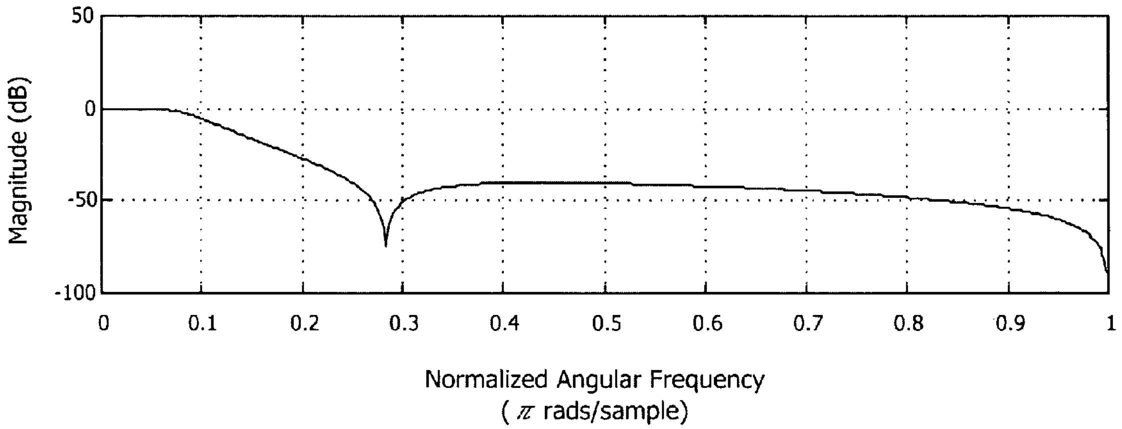
FIG. 2 is a graph plotting a magnitude for respective frequencies in a Chebyshev low-pass filter.
Figure 3:
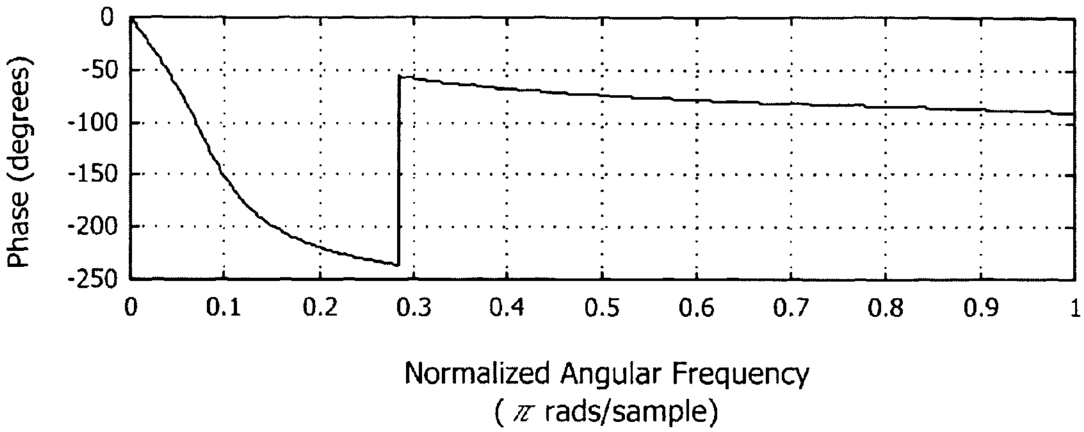
FIG. 3 is a graph plotting a phase for respective frequencies in a Chebyshev low-pass filter.

The present invention uses a Chebyshev low-pass filter as one example of the low-pass filter. The cutoff frequency of the Chebyshev low-pass filter is 0.1, and the order thereof is 3. In the Chebyshev low-pass filter, a magnitude graph for respective frequencies is shown in FIG. 2, and a phase graph for respective frequencies is shown in FIG. 3.

After the low-pass filtering process, a sub-sampling process is performed, if necessary. The sub-sampling is a process of decreasing the number of samples. For example, if there are 2n samples, the amount of data is halved by a ½ sub-sampling. The sub-sampling has the effect of decreasing the number of calculations, so that it is suitable for distinguishing voice from non-voice noise when using equipment having insufficient system performance.

A sigmoid compression unit 150 performs sigmoid compression on the low-pass-filtered signal. The spectral peaks of the input signal have different values, and when passed through the sigmoid compression process, the peaks of the spectrum become uniform.

For sigmoid compression, the sigmoid compression unit 150 applies a sigmoid compression equation, such as the following Equation (3), to each frequency.

$$F(x)=\frac{\alpha}{\alpha+e^{-\beta(x-\mu)}} \quad (3)$$

Here, x is a component (sample) of a spectrum vector, which is composed of the low-pass-filtered samples, F(x) is a spectrum vector which is generated by the sigmoid compression, and μ is a component (sample) of a vector that is composed of average values (hereinafter referred to as "sample averages") for respective samples; μ is acquired using a method (first method) of taking a sample average from current frames regardless of whether they comprise a voice region, or a method (second method) of taking a sample average for respective frequencies from consecutive frames in a non-voice region. In the first method, a single μ is acquired, whereas in the second method, vector values having different μs for respective frequencies are acquired, so that the second method is very efficient in the case where a noise signal has colored noise.

The constant α is related to a value that is acquired when x is identical to the average value, that is, α/(α+1). If α is set to 1, this value is 0.5, which is acquired when x is identical to the average value. Since values close to the average value are likely to represent non-voice signals, it is preferred that α be determined so that the sigmoid compression value has a small value. As a result, it is preferable that α be smaller than 1

Furthermore, β represents the extent to which a spectrum x affects the sigmoid function, that is, the extent of influence of the sigmoid function. Thus, when β is adjusted, it is possible to adjust the gain of the sigmoid function.

In the present invention, β may appropriately be the inverse of the average of the spectrum, including voices. For example, when the sample average is 3000, it is appropriate that β be about 0.0003.

A result value (hereinafter referred to as a "sigmoid value") generated by the sigmoid compression has an approximately intermediate value for silence. For voice, the sigmoid value is approximately 1 when x is much larger than the sample average, and is approximately 0 when x is much smaller than the sample average.

As described above, sigmoid compression performs the role of roughly classifying x into values which approximate the three values: 0, $\alpha/(\alpha+1)$ and 1.

Figure 4:
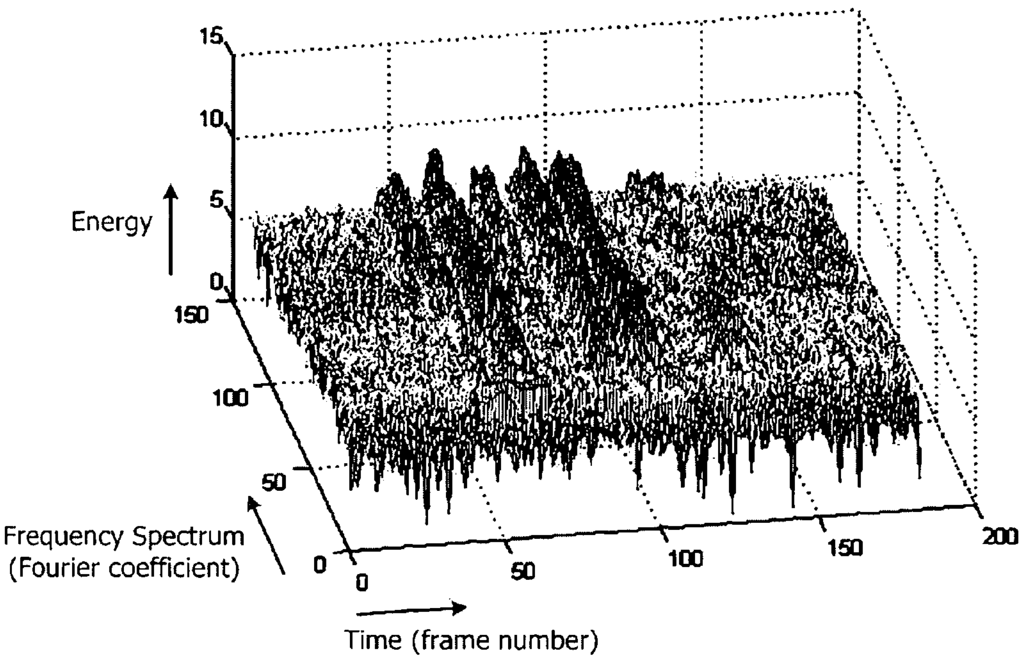
FIG. 4 is a graph plotting a signal waveform before sigmoid compression.
Figure 5:
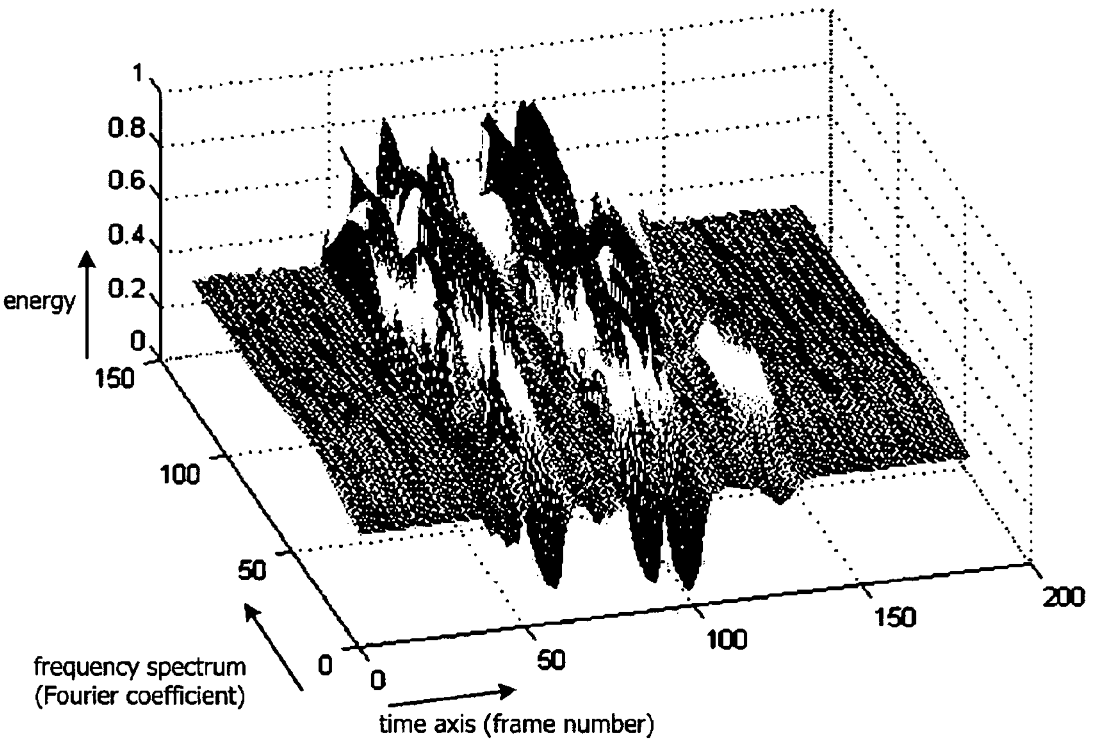
FIG. 5 is a graph plotting the signal of FIG. 4 after undergoing sigmoid compression.

For example, when sigmoid compression is performed using the signal shown in FIG. 4, as an input, the results are shown in FIG. 5. As shown in FIG. 5, the result value generated by the sigmoid compression falls between 0 and 1, and it can be seen that the signal and noise are more clearly distinguished.

A parameter generation unit 160 generates a scalar-voice detection parameter (hereinafter referred to as a "parameter"), which can represent a spectrum vector (that is, F(x)), by transforming the spectrum vector that has passed through the sigmoid compression process. The transforming process is performed in a similar manner to the process of adding entropy to each spectrum vector component, through which a vector value is transformed into a scalar value.

If one component of any compressed vector spectrum F(x) is expressed as $y_k$(F(x) is composed of the components of $\{y_0, y_1, \ldots, y_{n-1}\}$), the parameter is calculated using equation (4):

$$P(x) = \sum_{k=0}^{n-1} y_k \log(y_k), \tag{4}$$

As described above, since the parameter is generated through a vector-scalar transformation, one spectrum vector can be digitized. Voices, which form a broadband signal, have information up to 6 kHz, and may have different spectrum shapes depending on voice features. However, using the parameter it is possible to make a digitized determination regardless of an input signal band, a spectrum shape, or the like.

One thing that differs from the general entropy acquisition is the removal of the limitation that $$\sum_{k=0}^{n-1} y_k = 1.$$

Figure 6:
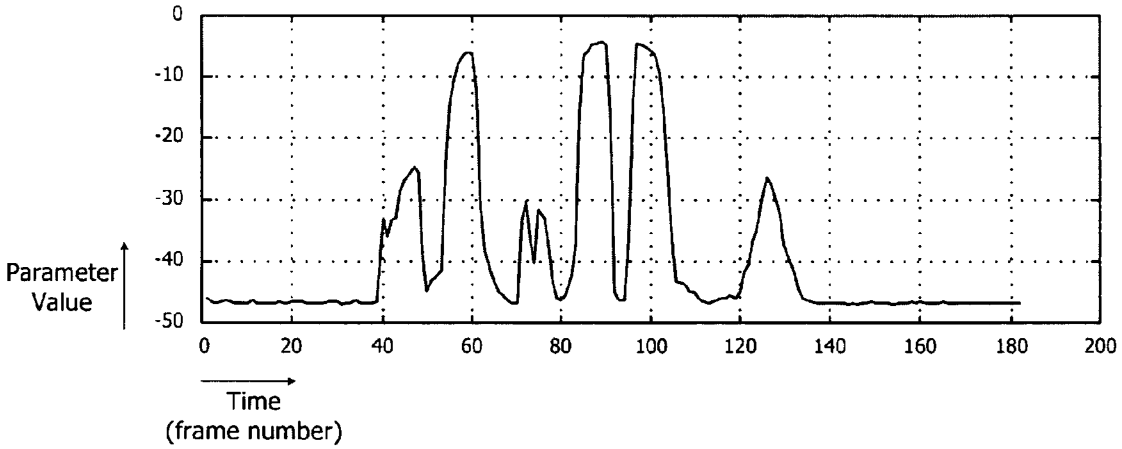
FIG. 6 is a graph plotting results generated by vector-to-scalar transforming the signal of FIG. 5.

When the signal resulting from sigmoid compression, as shown in FIG. 5, is vector-to-scalar transformed as shown in FIG. 5, the results thereof are as shown in FIG. 6. As shown in FIG. 6, one parameter exists for one frame, and the reason that the frequency axis of FIG. 5 disappears is that an entropy-weighted average has been calculated along a frequency axis through the vector-to-scalar transformation.

Meanwhile, a voice region determination unit 170 determines that the region in which the parameter exceeds a predetermined value is a voice region by comparing the generated parameter with the predetermined value. In FIG. 6, for example, frames whose parameter value exceeds −40 are determined to fall within a voice region. When the threshold value is increased, the number of frames which are determined to fall within the voice region decreases, and when the threshold value is decreased, the number of frames which are determined to fall within the voice region increases. As a result, the strictness of the voice region detection may be appropriately varied by adjusting the threshold value.

Each component of FIG. 1 may be implemented using software, or hardware such as a Field-Programmable Gate Array (FPGA) or an Application-Specific Integrated Circuit (ASIC). However, the components are not limited to software or hardware, and may be configured to reside in an addressable storage medium, or to run one or more processors. Functions, which are respectively provided in the components, may be implemented using sub-components or one component that integrates a plurality of components and performs a specific function.

Figure 7:
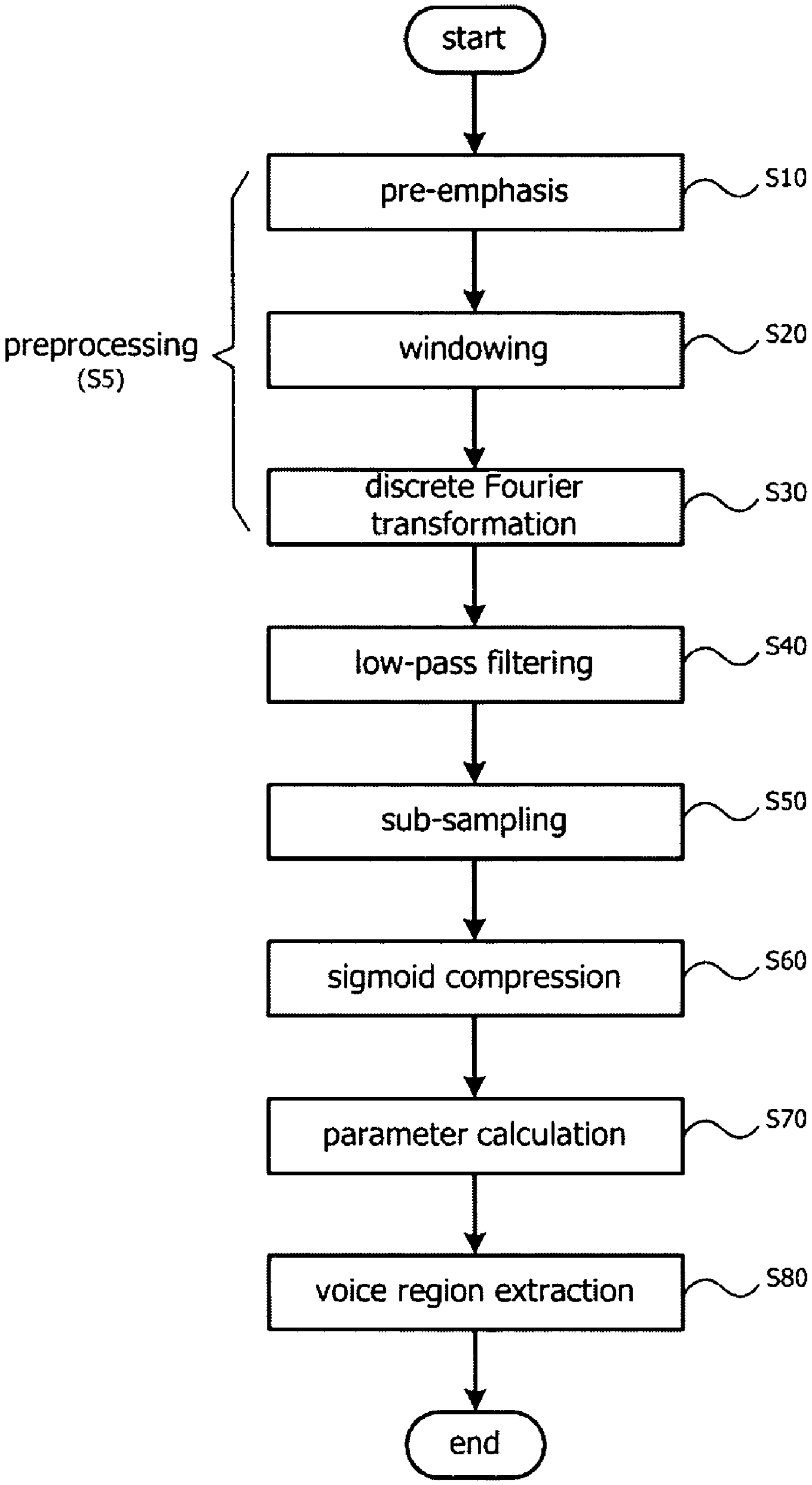
FIG. 7 is a diagram showing one embodiment of a method of detecting a voice region in accordance with the present invention.

FIG. 7 is a diagram showing one embodiment of a method of detecting a voice region in accordance with the present invention.

The method of detecting a voice region includes step S5 of converting an input voice signal into a frequency domain signal by preprocessing the input voice signal, step S60 of performing sigmoid compression on the converted signal, step S70 of transforming a spectrum vector generated by the sigmoid compression into a voice detection parameter in scalar form, and step S80 of extracting the voice region using the parameter, and may further include step S40 of low-pass-filtering the converted frequency domain signal and providing it as an input for sigmoid compression.

Furthermore, step S40 may include sub-sampling step S50 of decreasing the number of samples.

In this case, step S5 is an example, and may be further divided into step S10 of pre-emphasizing the input voice signal, step S20 of applying a predetermined window to the pre-emphasized signal, and step S30 of Fourier transforming the signal to which the window has been applied.

As described above, step S60 may be performed according to Equation (3), and step S70 may be performed according to Equation (4).

Furthermore, step S80 is performed by comparing the parameter with a predetermined threshold value and determining that the region in which the parameter exceeds the threshold value is a voice region.

Figure 8A:
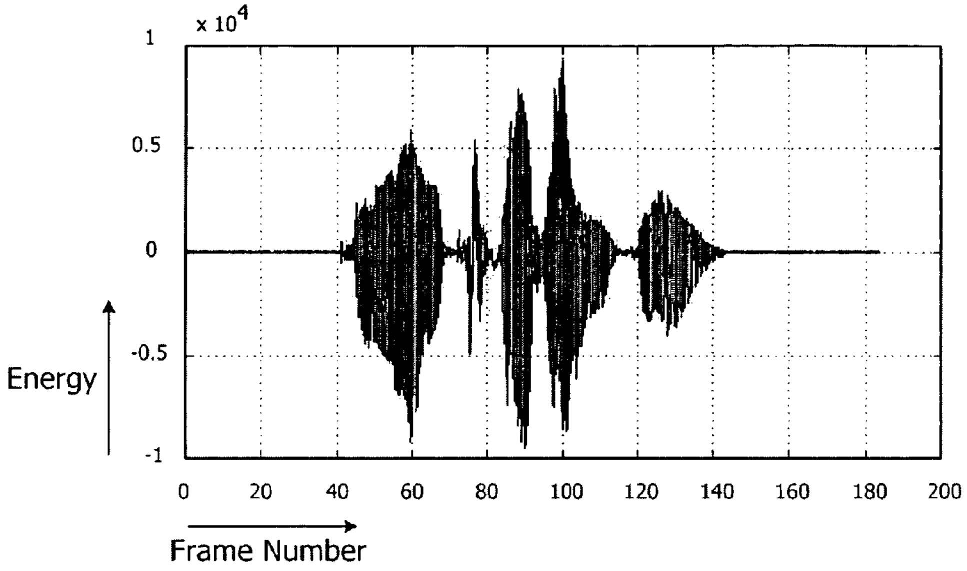
FIG. 8A is a diagram plotting an example waveform of a clean voice signal.
Figure 8B:
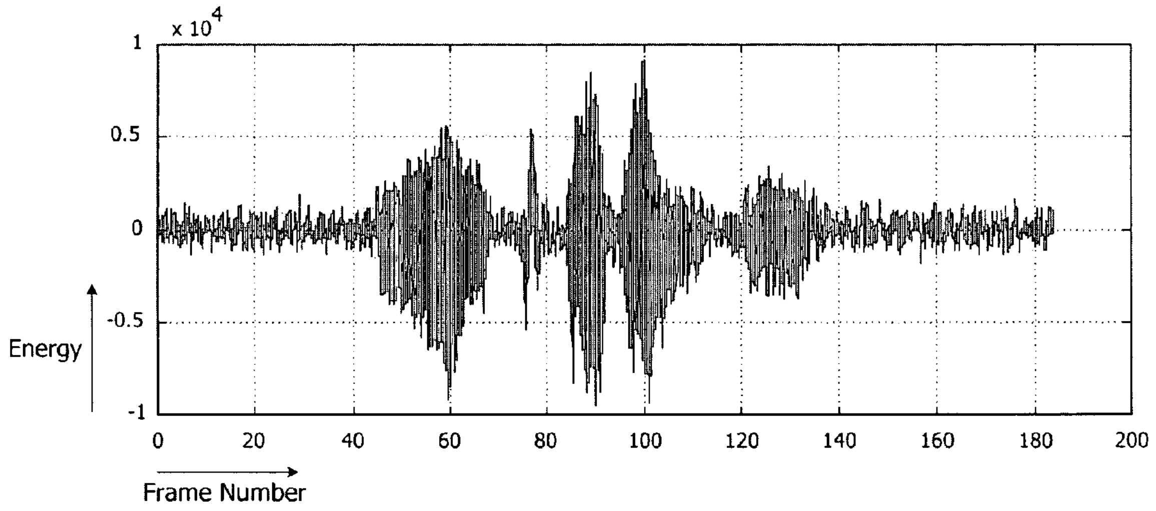
FIG. 8B is a graph plotting an example waveform of a signal in which voices and noise are mixed when the SNR of the voice signal of FIG. 8A is set to 9 dB.
Figure 8C:
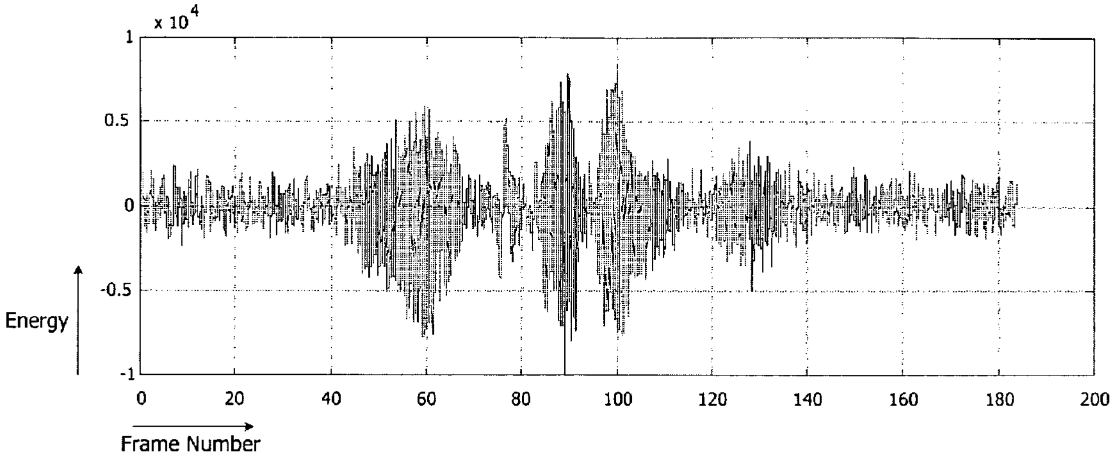
FIG. 8C is a graph plotting an example waveform of a signal in which voices and noise are mixed when the SNR of the voice signal of FIG. 8A is set to 5 dB.

Several experiments using the present invention were performed and the results are described below. Assuming that a clean voice signal as shown in FIG. 8A was input, predetermined noise was added to the voice signal based on a predetermined SNR and then the experiments were performed. FIG. 8B is a diagram showing the waveform of a signal in which a voice and noise are mixed when the SNR is 9 dB, and FIG. 8C is a diagram showing the waveform of a signal in which a voice and noise are mixed when the SNR is 5 dB. In each experiment, $\alpha$ of Equation (3) was set to 0.75, $\beta$ was set to 0.0003, and the method (second method) of taking a sample average from non-voice frames was used.

Figure 9:
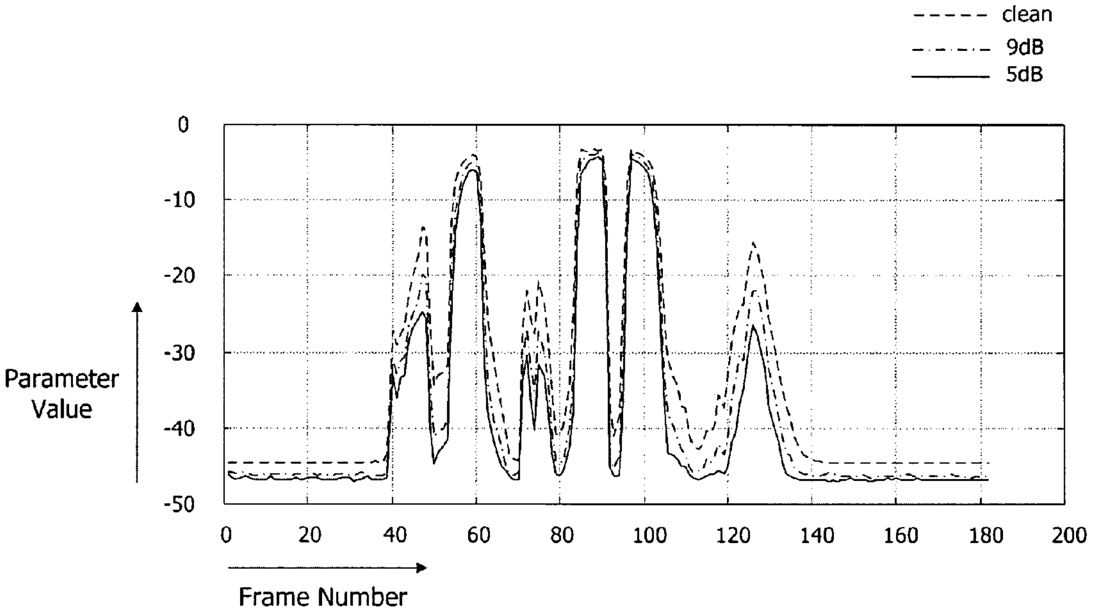
FIG. 9 is a graph plotting figures, which are obtained by applying the present invention to the respective signals of FIGS. 8A to 8C.

FIG. 9 is graphs plotting parameters, which are acquired by applying the present invention to the respective signals of FIGS. 8A to 8C, for a frame axis. In FIG. 9, the figure plotted by a dotted line represents parameters that are acquired using the signal (clean signal) of FIG. 8A as an input, the figure plotted by a one-dot chain line represents parameters that are acquired using the signal (9 dB signal) of FIG. 8B as an input, and the figure plotted by a solid line represents parameters that are acquired using the signal (5 dB signal) of FIG. 8C as an input in accordance with the present invention.

Upon observation of the results, it can be appreciated that respective figures represent conspicuous peaks in the voice region, and parameter values in the non-voice region do not vary although the SNR varies.

Figure 10A:
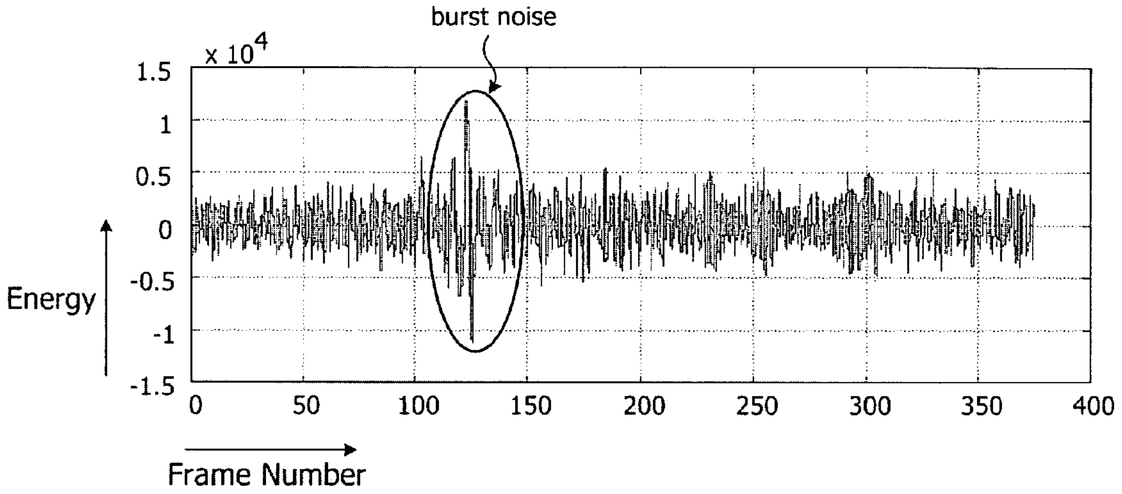
FIG. 10A is a diagram plotting an example waveform of a voice signal having burst noise and continuous noise.
Figure 10B:
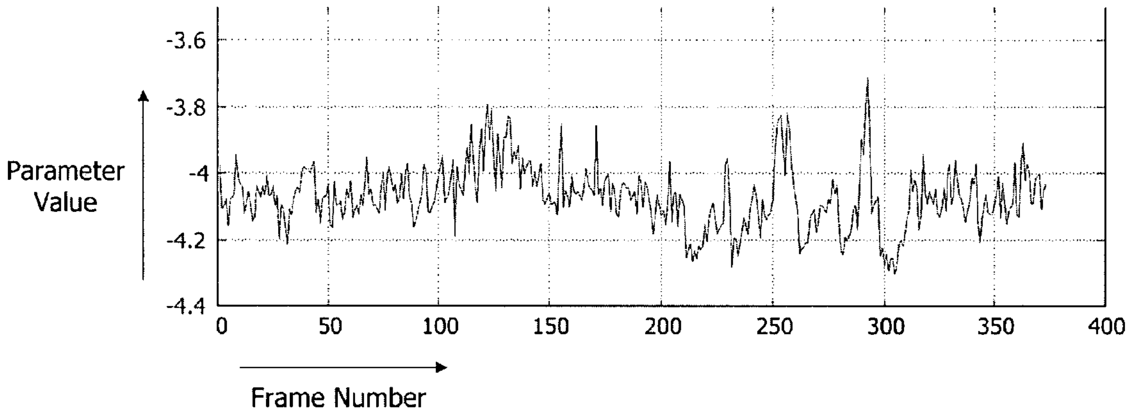
FIG. 10B is a graph plotting experimental results when using only an entropy-based transformation method.
Figure 10C:
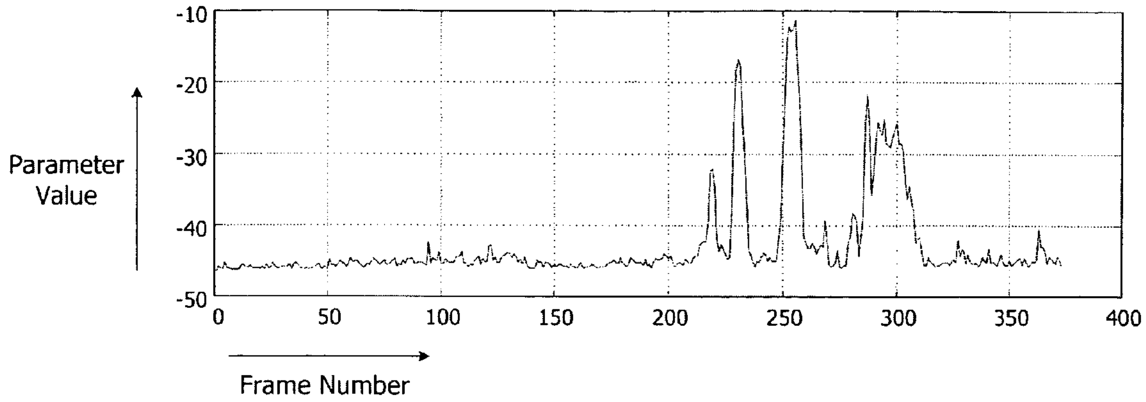
FIG. 10C is a graph plotting experimental results when using a second method in accordance with the present invention.

The present invention is also resistant to burst noise. FIGS. 10A to 10C are graphs illustrating the comparison between the present invention and the prior art for an input signal in which burst noise exists. The input signals used in the present invention are voice signals in which predetermined burst noise and continuous noise are included as shown in FIG. 19A. FIG. 10B is a graph plotting experimental results that are acquired using only an entropy-based transformation method without low-pass filtering and sigmoid compression in accordance with the present invention, and FIG. 10C is a graph plotting experimental results that are acquired using the second method in accordance with the present invention.

Referring to FIG. 10B, due to entire continuous noise, the distinction between a voice and non-voice noise is not clear. Specifically, parameter values are relatively high at the point at which the burst noise is generated, so there is the possibility of mistaking the burst noise for a voice. On the other hand, as shown in FIG. 10C, a voice is clearly distinguishable from noise, and parameter values are not significantly different from those of a continuous noise region at the point at which the burst noise is generated. As a result, it can be confirmed that the method of detecting a voice region in accordance with the present invention can sufficiently handle various types of noise.

Voice region detection is a necessary element for a voice recognition system in a terminal having insufficient calculation capacity, and it directly improves voice recognition performance and user convenience.

In accordance with the present invention, parameters that are attained through a small amount of calculation and that enable the detection of a voice region, are provided for voice region detection.

Furthermore, in accordance with the present invention, a voice region detection method is provided whose determination logic is not altered depending on noise and that is resistant to various types of noise such as burst noise and continuous noise.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of detecting a voice region with a voice region detecting apparatus, the method comprising:

converting an input voice signal representing at least a physical voice into a frequency domain signal by preprocessing the input voice signal;

performing sigmoid compression on the converted signal;

transforming at least one component of a spectrum vector generated by the sigmoid compression into a scalar voice detection parameter wherein the transforming is performed using the equation $$P(x) = \sum_{k=0}^{n-1} y_k \log(y_k),$$

where $y_k$ is a component of the sigmoid compressed spectrum vector, and P(x) is a scalar voice detection parameter;

detecting the voice region by comparing the scalar voice detection parameter with a threshold and determining that a region in which the scalar voice detection parameter exceeds the threshold is the voice region; and outputting a voice signal in the detected voice region, wherein the method is performed using the voice region detecting apparatus.

2. The method as set forth in claim 1, further comprising maintaining consonant parameter values similar to those of vowel parameter values by low-pass-filtering the converted frequency domain signal and providing the low-pass-filtered signal as an input for the sigmoid compression.

3. The method as set forth in claim 1, wherein the converting of the input voice signal comprises:

pre-emphasizing the input voice signal;

applying a predetermined window to the pre-emphasized signal; and

Fourier transforming the signal to which the window has been applied.

4. The method as set forth in claim 1, wherein the sigmoid compression is performed using the equation:

$$F(x) = \frac{\alpha}{\alpha + e^{-\beta(x-\mu)}},$$

where x is a component of a spectrum vector which is composed of low-pass-filtered samples, F(x) is a spectrum vector generated as a result of the sigmoid compression, μ is a component of a vector which is composed of average values for respective components, and α and β are predetermined constant values.

5. The method as set forth in claim 4, wherein α is a constant that is less than 1.

6. The method as set forth in claim 4, wherein μ is acquired by taking a sample average from current frames irrespective of a voice region.

7. The method as set forth in claim 4, wherein μ is acquired by taking a sample average from frames in a non-voice region for respective frequencies.

8. The method as set forth in claim 4, wherein β is an inverse of an average of a spectrum that includes a voice.

9. An apparatus for detecting a voice region including a processor having computing device-executable instructions, the apparatus comprising:

a pre-processing unit for converting an input voice signal into a frequency domain signal by preprocessing the input voice signal;

a sigmoid compression unit for performing sigmoid compression on the converted signal;

a parameter generation unit for transforming a spectrum vector generated by the sigmoid compression into a scalar voice detection parameter wherein the parameter generation unit performs a vector-to-scalar transformation using the equation $$P(x) = \sum_{k=0}^{n-1} y_k \log(y_k),$$

where $y_k$ is a component of the sigmoid compressed spectrum vector, and P(x) is a scalar voice detection parameter; and a voice region detection unit, executing on the processor, for detecting the voice region by comparing the scalar voice detection parameter with a threshold and determining that a region in which the scalar voice detection parameter exceeds the threshold is the voice region.

10. The apparatus as set forth in claim 9, further comprising a low-pass filtering unit to maintain consonant parameter values similar to those of vowel parameter values by low-pass-filtering the converted frequency domain signal and providing the low-pass-filtered signal as an input for the sigmoid compression.

11. The apparatus as set forth in claim 9, wherein the pre-processing unit pre-emphasizes the input voice signal, applies a predetermined window to the pre-emphasized signal, and Fourier transforms the signal to which the window has been applied.

12. The apparatus as set forth in claim 9, wherein the sigmoid compression unit performs the sigmoid compression according to the equation:

$$F(x) = \frac{\alpha}{\alpha + e^{-\beta(x-\mu)}},$$

where x is a component of a spectrum vector which is composed of low-pass-filtered samples, F(x) is a spectrum vector generated as a result of sigmoid compression, μ is a component of a vector which is composed of average values for respective components, and α and β are predetermined constants.

13. The apparatus as set forth in claim 12, wherein α is a constant that is less than 1.

14. The apparatus as set forth in claim 12, wherein μ is acquired by taking a sample average from current frames irrespective of a voice region.

15. The apparatus as set forth in claim 12, wherein μ is acquired by taking a sample average from frames in a non-voice region for respective frequencies.

16. The apparatus as set forth in claim 12, wherein β is an inverse of an average of a spectrum that includes a voice.

17. A non-transitory computer-readable storage media storing computer-readable code for implementation of a method of detecting a voice region, the method comprising:

converting an input voice signal representing at least a physical voice into a frequency domain signal by pre-processing the input voice signal;

performing sigmoid compression on the converted signal;

transforming at least one component of a spectrum vector generated by the sigmoid compression into a scalar voice detection parameter wherein the transforming is performed using the equation $$P(x) = \sum_{k=0}^{n-1} y_k \log(y_k),$$

where $y_k$ is a component of the sigmoid compressed spectrum vector, and P(x) is a scalar voice detection parameter;

detecting the voice region using the parameter by comparing the scalar voice detection parameter with a threshold and determining that a region in which the scalar voice detection parameter exceeds the threshold is the voice region; and outputting a voice signal in the determined voice region.

* * * * *